J. CURREN.
Safety-Stop for Children's Carriages.

No. 200,856.  Patented March 5, 1878.

WITNESSES  
William L. Coop.  
L. P. Langworthy

INVENTOR  
James Curren  
by Joseph A. Miller  
Attorney

UNITED STATES PATENT OFFICE.

JAMES CURREN, OF PROVIDENCE, RHODE ISLAND.

IMPROVEMENT IN SAFETY-STOPS FOR CHILDREN'S CARRIAGES.

Specification forming part of Letters Patent No. 200,856, dated March 5, 1878; application filed January 16, 1878.

*To all whom it may concern:*

Be it known that I, JAMES CURREN, of the city and county of Providence, and State of Rhode Island, have invented certain new and useful Improvements in Safety-Stops for Baby-Carriages; and I hereby declare that the following is a full, clear, and exact description of the same, reference being had to the accompanying drawings, forming part of this specification.

Baby or children's carriages are usually propelled by being pushed in front of the nurse or attendant, and are often required to stand on uneven or sloping roads or walks not sufficiently level to allow them to stand when temporarily released. They are liable to roll down hill, and children are frequently injured for life by the temporary neglect of the servant allowing the baby-carriage to roll away and to upset, frequently in the gutters, and often under the wheels of passing carriages. Accidents also happen frequently on perfectly level roads or walks when a sudden gust of wind propels the baby and carriage, and injures both.

The object of this invention is to prevent such accidents, and to provide easy and ready means for locking the same, so that it may be safely left standing in any place; and it consists in the particular construction and combination of parts, as will be hereinafter described, and pointed out in the claim.

Figure 1:
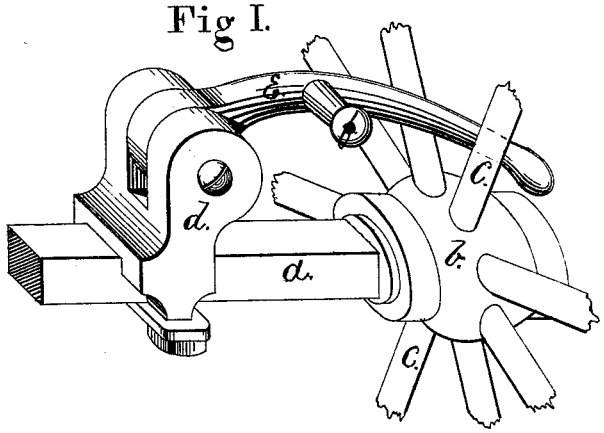
Figure 2:
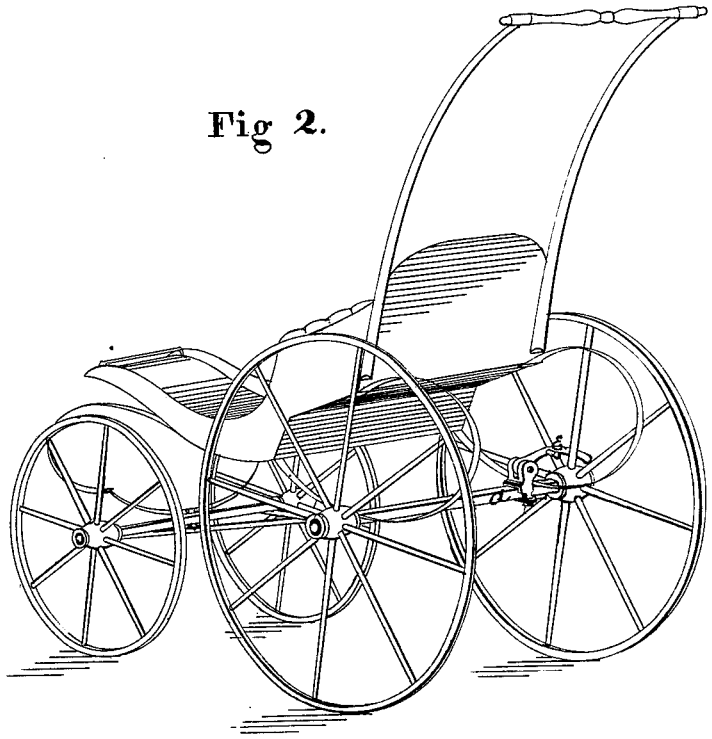

Figure 1 is a hinged stop, secured to the axle of a baby-carriage, and arranged to enter the wheel, so as to lock the same. Fig. 2 is a perspective view of a baby-carriage provided with one of my safety-stops.

In the drawings, $a$ is the axle of a baby-carriage; $b$, the hub of the wheel; and $c\,c$, the spokes. $d$ is a hinge, arranged to be secured to the axle or any other convenient part of a baby-carriage. E is the hinged arm or stop, arranged so that the same may be readily drawn between the spokes of a wheel, and the same held so as to prevent its turning around. $f$ is a knob or handle, by which the hinged arm may be operated, if desired.

The hinged arm E may be wholly or partially covered with rubber or other elastic material, so as to prevent the scratching or disfiguring of the paint.

The operation of the device is so clearly shown in the drawings that any further description is superfluous. It is simple and cheap, and may be readily placed on a baby-carriage. It is easily operated, and insures safety to the child and carriage.

To facilitate the use of the stop a string, cord, or chain may be connected with the arm E or with the knob $f$, and also with the handle or any other part most convenient, and thus the stop may be placed between the spokes, or removed, at pleasure and with ease.

I am aware that carriages have heretofore been provided with stops which serve to lock the wheels of the carriage, and hence I make no broad claim to such an arrangement of parts.

Having thus described my invention, I claim as new and desire to secure by Letters Patent—

The combination, with the axle and wheel of a baby-carriage, of a swinging stop, E, hinged to a bracket or clip, $d$, secured to the axle, whereby the stop may rest upon the axle when not in use, and be turned over between the spokes of the wheel when required to serve as a stop, substantially as described.

JAMES CURREN.

Witnesses:
JOSEPH A. MILLER,
H. S. BABCOCK.